April 25, 1933.  J. SACHS  1,905,002
ELECTRIC APPLIANCE INCLOSING CABINET
Original Filed July 27, 1927
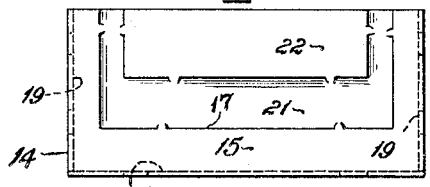
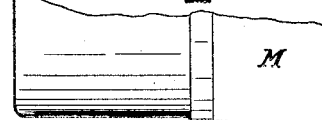
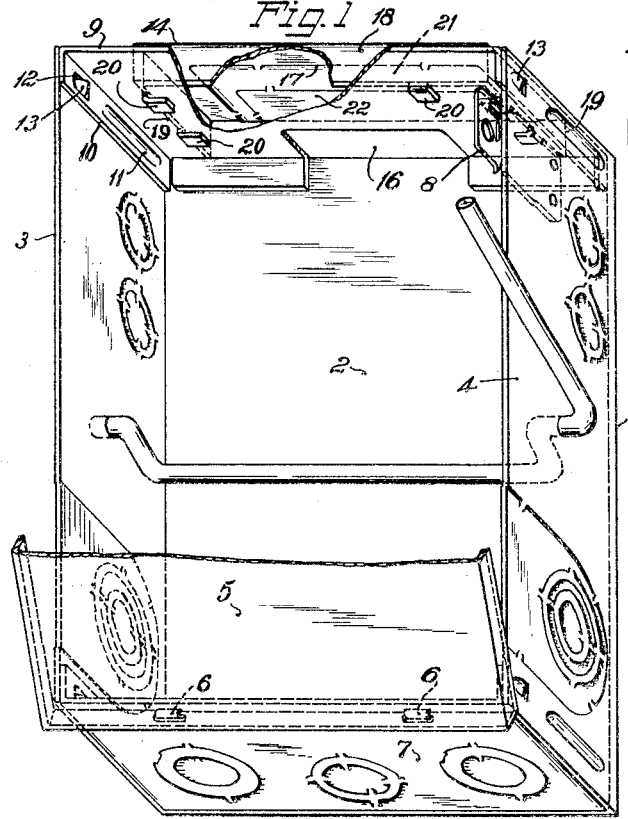
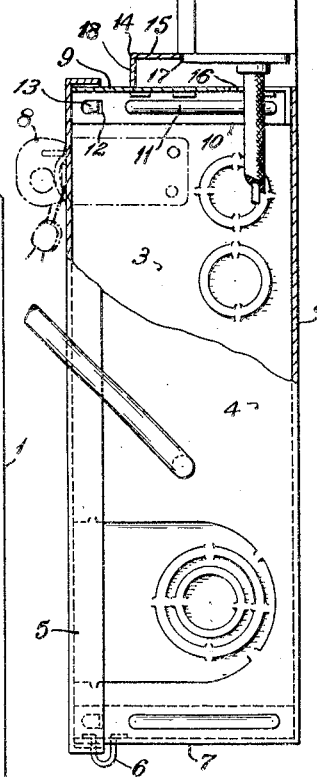
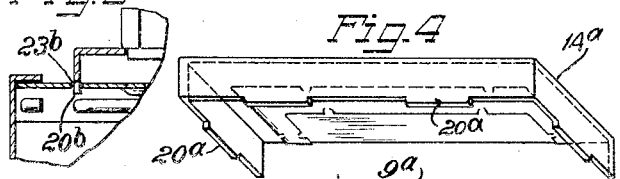
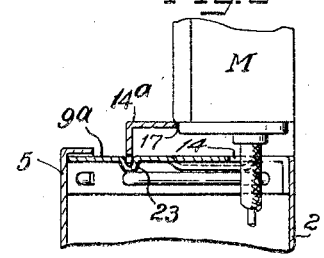
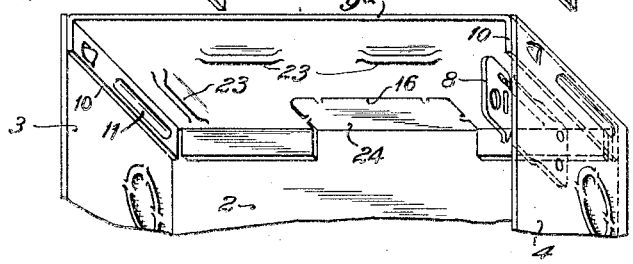
Inventor
Joseph Sachs
By S. Jay Teller
Attorney Patented Apr. 25, 1933

1,905,002

UNITED STATES PATENT OFFICE

JOSEPH SACHS, OF WEST HARTFORD, CONNECTICUT

ELECTRIC APPLIANCE INCLOSING CABINET

Continuation of application Serial No. 204,077, filed July 27, 1927. This application filed September 23, 1931. Serial No. 565,536.

The invention relates to a box or cabinet adapted for inclosing a current controlling appliance such as is commonly used for service entrance equipment in association with an electric meter. In an installation of this type one end wall of the cabinet, usually the upper end wall, is constructed for protective association with an electric meter and in accordance with common prior practice the end wall has been provided or has been adapted to be provided with an opening of such size as to receive and approximately fit at least a part of the terminal chamber portion of the meter. The cabinet has thus served not only to inclose and protect the appliance therein but has also served to inclose and protect the terminal portion of the meter and the wiring connections extending between the appliance and the meter.

A construction of the type described, wherein a part of the terminal chamber portion of the meter extends directly through an opening in the ordinary end wall of the cabinet, is open to the objection that, if there are any major inaccuracies in the shape of the meter or in the shape of the opening, sufficient space may be provided to permit an unscrupulous customer to insert wires for the theft of current. One object of the present invention is to provide a cabinet so constructed that theft of current as last above described is rendered more difficult, this result being obtained by providing two parallel walls at the meter end of the box, the outer of the said walls having an opening to receive and approximately fit the terminal chamber portion of the meter and the inner of the said walls having a much smaller opening for the passage of the wires which connect the meter with the appliance inclosed within the cabinet. Even if there should be any space between the meter and the edges of the opening in the outer wall it would be practically impossible to insert wires through this space into the interior of the cabinet as the wires would be obstructed by the inner wall having only a small opening therein.

Another object of the invention is to provide an end wall structure of the two-wall type which initially serves to close the cabinet prior to meter installation and which is adapted to protect the meter upon installation and to provide a passageway for the wires extending between the meter and the interior of the cabinet. This object is attained by providing the outer wall with an opening or with means for forming an opening adapted to receive the meter and by providing the inner wall with an easily separable scored section which section initially closes the cabinet prior to installation of the meter and is removable upon installation of the meter to permit the passage of wires.

This application constitutes a continuation of my copending application Serial No. 204,077 for Electric appliance inclosing cabinet, filed July 7, 1927.

In the accompanying drawing I have shown two embodiments of the invention but it will be understood that the drawing is intended for illustrative purposes only and is not to be construed as defining or limiting the scope of the invention, the claims forming a part of this specification being relied upon for that purpose.

Of the drawing:

Fig. 1 is a perspective view of a cabinet embodying the invention, certain parts being broken away in order that other parts may more clearly appear.

Fig. 2 is a side view of the cabinet shown in Fig. 1 with certain parts broken away. This view also shows a part of an electric meter in direct association with the cabinet.

Fig. 3 is a plan view of the adapter member shown in Fig. 1.

Fig. 4 is a fragmentary view similar to Fig. 1 but showing an alternate embodiment of the invention. In this view the adapter member is shown separated from the end wall.

Fig. 5 is a fragmentary view similar to Fig. 2 but showing the alternate construction as illustrated in Fig. 4.

Fig. 6 is a fragmentary view similar to Fig. 5 but showing a variation of the construction illustrated in Figs. 4 and 5.

Referring to the drawing, 1 represents a box or cabinet adapted for inclosing an electric circuit controlling appliance. The appliance to be inclosed within the cabinet may be of any usual or prefered form, this appliance being omitted from the drawing as it does not of itself form any part of the present invention. The cabinet may be and preferably is of conventional construction being formed of sheet metal with a back wall 2 and side walls 3 and 4. The cabinet is provided with an openable front cover 5 which may be hinged at 6 to the bottom wall 7 so as to be openable by forward and downward pivotal movement. The cover 5 is flanged at its edges in the usual way. A latch 8 is provided for holding the cover in closed position.

Instead of providing only a plain end wall for the upper end of the cabinet I provide a closure structure which includes two substantially parallel walls spaced apart by a small distance. The outer wall has or is adapted to have an opening therein of such a size that it may receive and approximately fit the terminal chamber portion of a meter. The inner wall has an opening therein too small to receive any portion of the meter but nevertheless large enough to permit the passage of the wires which connect the meter with the appliance within the cabinet. Preferably and as illustrated the inner wall having the smaller opening is similar in form to an end wall of conventional design and the outer wall having the meter receiving opening is a part of an adapter member associated with the end wall proper, but I do not necessarily limit myself to this specific arrangement.

As shown the end wall proper of the cabinet appears at 9, this end wall being normally positioned perpendicularly to the back wall 2 and the side walls 3 and 4 and engaging the said walls so as to substantially close the cabinet at the upper end. The end wall may be permanently secured in place but preferably it is detachable. As shown, the end wall is detachably connected with the side walls in accordance with the disclosure in my prior Patent 1,458,728. The end wall is provided with flanges 10, 10 each of which is grooved at 11 to receive a rib pressed inward from the corresponding side wall of the cabinet. Each flange is also provided with an opening 12 to receive a lug 13 pressed inward from the corresponding side wall of the cabinet. It will be understood that the lugs 13, 13 normally prevent removal of the end wall but that the end wall can be removed by first flexing the said walls 3 and 4 outward to withdraw the lug 13, 13 from the openings 12, 12. It will be obvious that when the cover 5 is closed the flanges thereon prevent the lateral flexure of the side walls and therefore prevent the withdrawal of the end wall.

In addition to the end wall proper I provide an auxiliary member which includes a wall substantially parallel with the said end wall. Preferably and as shown the auxiliary member is on the outside of the end wall and is in the form of a meter adapter member 14 having a flat top wall 15.

When the auxiliary member is on the outside as shown the end wall 9 instead of being provided with an opening large enough to receive the terminal portion of a meter as has heretofore been customary is provided with a relatively small opening 16. This opening 16 is large enough to permit the passage therethrough of the wires extending between a meter and the appliance inclosed with the cabinet, but it is not large enough to permit any portion of the meter itself to project into the cabinet. When the end wall is movable or removable in the forward direction the opening 16 is open at the rear.

In order that the downward projecting portion of the meter may be properly protected the top wall 15 of the said adapter member 14 is provided with an opening 17 therein to receive and approximately fit the downward projecting portion of the meter. When the end wall is movable or removable in the forward direction the adapter member is ordinarily movable with it and the opening 17 is therefore open at the rear to permit such movement. The adapter member 14 is provided with a vertical front flange 18 and vertical side flanges 19, 19 which serve as means for closing the space between the said walls at the front and at both sides of the said openings 16 and 17. The downward projecting portion of the meter may extend with a substantially close fit into the opening 17 in order to ensure the protection of the said portion of the meter as well as of the appliance or other parts within the cabinet. The front and side flanges of the adapter member 14 directly engage and fit the end wall 9 at the top face thereof. As illustrated in Figs. 1 and 2 the adapter member is positively connected with the end wall proper, being provided with tongues 20, 20 which extend through corresponding holes or recesses in the end wall and which are bent over to engage the inner face of the end wall.

The relationship between the openings 16 and 17 is preferably such that the smaller opening 16 is at its front and sides entirely within the downward projected outline of the larger opening 17. With a meter M in place as clearly shown in Fig. 2 the upper portion of the cabinet is entirely closed there being no space through which wires could be inserted for the theft of current. Even if it were possible to insert wires between the meter and the edges of the opening 17 these wires could not extend into the cabinet as they would be directly obstructed by the portions of the end wall proper at the front and at the sides of the opening 16.

The opening 17 may be initially closed, the top wall 15 of the adapter unit being provided with an easily separable scored knockout section conforming in outline to the said opening. It may be desirable to provide not only the said easily separable knockout section 21 adapted to provide an opening 17 for a meter of one size but to also provide a second easily separable knockout section 22 adapted to provide a different smaller opening for a meter of a smaller size. It will be understood that when the two separable knockout sections 21 and 22 are provided either of them can be removed as required to suit the particular meter which is to be installed. It will further be understood that when the cabinet with the end wall and the adapter member are installed prior to the installation of the meter the end wall and the adapter member with the included separable sections serve to completely close the top of the cabinet to exclude dirt and to prevent tampering with the inclosed appliance. I do not herein claim as a part of the present invention a meter service box having an end wall with a knockout section therein adapted, when removed, to provide an opening for receiving the meter, as this subject matter is set forth and claimed in my copending application for Box for inclosing electrical appurtenances, Serial No. 578,342, filed July 29, 1922.

In Fig. 4 I have shown an alternate construction wherein the adapter member 14ª is readily detachable from the end wall 9ª. The details of construction of the end wall of the adapter member may be the same as already described except that the end wall is provided with depressions 23, 23 adapted to receive short tongues 20ª, 20ª formed on the adapter. With this construction the opening 16 may be initially closed by an easily separable knockout section 24. When the adapter member is assembled with the end wall and with the meter M as shown in Fig. 5 the tongues 20ª, 20ª are entered in the recesses 23, 23 and the meter M prevents any upward movement of the adapter member thus locking it in place on the end wall.

When the cabinet with its inclosed appliance is installed prior to the installation of the meter the adapter member 15ª can be installed at the same time or it can be entirely omitted. In either case the end wall itself with the knockout section 24 in place serves to completely close the cabinet at the upper end thereof. When the meter is afterward installed the knockout section 24 can be removed and the adapter member can be put in place as shown in Fig. 5. It will be understood that as concerns the use of the removable or knockout section 24 I do not limit myself to an adapter member which is readily separable from the main end wall and I do not limit myself as concerns the presence or absence of knockout sections in the adapter member.

Fig. 6 illustrates a variation of the construction shown in Figs. 4 and 5. The end wall proper instead of having depressions 23 is provided with openings 23ᵇ and the adapter member is provided with tongues 20ᵇ which project through the openings 23ᵇ as shown. The construction is or may be otherwise similar to that shown in Figs. 5 and 6.

What I claim is:

1. In an electric meter protecting cabinet adapted for inclosing a current controlling appliance, the combination with the back and side walls of the cabinet, of an end wall normally positioned perpendicularly to the said back and side walls so as to substantially close the cabinet at one end, the said end wall having an opening therein open at the rear and smaller than the downward projecting portion of an electric meter with which the cabinet may be associated and the said end wall being movable forward out of its normal position to facilitate meter installation, and an adapter member normally movable with the end wall and provided with vertical front and side flanges directly engaging and fitting the end wall at the outer face thereof in front of and at the sides of the opening therein, the said adapter member being provided with a flat top wall parallel with the end wall and having an opening therein into which the aforesaid portion of the meter may extend with a substantially close fit in order to ensure the protection of the said portion of the meter as well as of parts within the cabinet.

2. In an electric meter protecting cabinet adapted for inclosing a current controlling appliance, the combination with the back and side walls of the cabinet, of two substantially parallel walls at one end of the cabinet normally positioned perpendicularly to the said back and side walls, the outer of the said walls having an opening therein into which the downward projecting portion of a meter may extend with a substantially close fit in order to ensure the protection of the said portion of the meter and the inner of the said walls having an easily separable scored section serving when in place to close the cabinet prior to meter installation and serving upon removal to form an opening smaller than the first said opening and within the projected outline thereof at the front and both sides for the passage of conductor wires extending between the meter and the interior of the cabinet, and means closing the space between the said walls at the front and at both sides of the said openings.

3. In an electric meter protecting cabinet adapted for inclosing a current controlling appliance, the combination with the back and side walls of the cabinet, of two substantially parallel walls at one end of the cabinet normally positioned perpendicularly to the said back and side walls, the outer of the said walls having an easily separable scored section serving upon removal to provide an opening into which the downward projecting portion of a meter may extend with a substantially close fit in order to ensure the protection of the said portion of the meter and the inner of the said walls having an easily separable scored section serving when in place to close the cabinet prior to meter installation and serving upon removal to form an opening smaller than the first said opening and within the projected outline thereof at the front and both sides for the passage of conductor wires extending between the meter and the interior of the cabinet, and means closing the space between the said walls at the front and at both sides of the said openings.

4. In an electric meter protecting cabinet adapted for inclosing a current controlling appliance, the combination with the back and side walls of the cabinet, of two closely spaced substantially parallel and permanently connected walls at one end of the cabinet normally serving to substantially close the cabinet at the said end and both movable forward out of their normal positions to facilitate meter installation, the inner of the said walls having an opening therein open at the back and smaller than the downward projecting portion of an electric meter with which the cabinet may be associated and the outer of the said walls having an opening therein open at the back into which the aforesaid portion of the meter may extend with a substantially close fit in order to ensure the protection of the said portion of the meter as well as of parts within the cabinet, and means closing the space between the said walls at the front and at both sides of the said openings.

5. In an electric meter protecting cabinet adapted for inclosing a current controlling appliance, the combination with the back and side walls of the cabinet, of an end wall normally positioned perpendicularly to the said back and side walls so as to substantially close the cabinet at one end, the said end wall having an opening therein smaller than the downward projecting portion of an electric meter with which the cabinet may be associated and the portion of the wall surrounding the opening being imperforate but having depressions formed therein, and an adapter member separable from the end wall provided with vertical front and side flanges adapted to enter the depressions and to fit the end wall at the outer face thereof in front of and at the sides of the opening therein, the said adapter member being provided with a flat top wall parallel with the end wall and having an opening therein into which the aforesaid portion of the meter may extend with a substantially close fit in order to ensure the protection of the said portion of the meter as well as of parts within the cabinet.

In testimony whereof I have hereunto set my hand this 22d day of September, 1931.

JOSEPH SACHS.